US011586636B2

(12) United States Patent
Fernig et al.

(10) Patent No.: US 11,586,636 B2
(45) Date of Patent: Feb. 21, 2023

(54) METHODS AND SYSTEMS FOR GENERATING SEARCH RESULTS

(71) Applicant: Shopify Inc., Ottawa (CA)

(72) Inventors: David Fernig, Stockholm (SE); Robert Mousseau, Ottawa (CA); Andrew Valencik, Ottawa (CA); Lina Tovbis, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/951,821

(22) Filed: Nov. 18, 2020

(65) Prior Publication Data

US 2022/0156268 A1 May 19, 2022

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .......................... G06F 16/24578; G06F 16/248
See application file for complete search history.

(56) References Cited

U.S. PATENT DOCUMENTS

| | | | | |
|---|---|---|---|---|
| 8,005,823 | B1 * | 8/2011 | Marshall | G06F 16/2455 707/769 |
| 8,965,875 | B1 * | 2/2015 | Popovici | G06F 16/951 707/769 |
| 9,063,972 | B1 * | 6/2015 | Marra | G06F 16/245 |
| 9,152,698 | B1 * | 10/2015 | Dhamdhere | G06F 16/332 |
| 2006/0190436 | A1 * | 8/2006 | Richardson | G06F 16/738 |
| 2007/0011154 | A1 * | 1/2007 | Musgrove | G06F 40/30 707/999.005 |
| 2015/0066902 | A1 * | 3/2015 | Kim | G06F 16/951 707/722 |
| 2016/0224666 | A1 * | 8/2016 | Horvitz | G06F 16/951 |
| 2018/0349499 | A1 * | 12/2018 | Pawar | G06F 16/9536 |
| 2020/0183960 | A1 * | 6/2020 | Sharafi | G06F 16/3344 |
| 2020/0293586 | A1 * | 9/2020 | Singhal | G06F 16/9538 |

* cited by examiner

*Primary Examiner* — Son T Hoang
(74) *Attorney, Agent, or Firm* — Ridout & Maybee LLP

(57) ABSTRACT

Methods and systems for generating search results based on a search query, the method includes: receiving a first search query including one or more search terms; obtaining a list of search results for the first search query; determining, based on user interactions with unmodified search results for one or more previous search queries that included the one or more search terms, a first engagement score associated with the first search query; determining that the first engagement score is lower than a first threshold; responsive to determining that the first engagement score is lower than the first threshold, and modifying the list of search results.

21 Claims, 7 Drawing Sheets

METHODS AND SYSTEMS FOR GENERATING SEARCH RESULTS

FIELD

The present disclosure is related to generating search results for a search query. In particular, the present disclosure relates to methods and systems for customizing search results based on an original search query from a user.

BACKGROUND

Generally, a search engine may return search results that are relevant based on one or more search terms in a search query. The search results may be ranked based on relevancy or popularity (e.g., based on historical click-through rate), for example.

SUMMARY

In at least some cases, a search result that is actually relevant to a search query might not appear immediately useful to a user, and thus might not be viewed, when a visible portion of the search result contains terms or words that are different from the search terms used by the user.

For example, conventionally, users of an e-commerce platform, such as merchant or corporate users, may access a variety of useful content on a self-help website to help answer one or more questions regarding a server without having to call a customer service representative. One of the main ways of finding relevant information is to use a search function on the self-help website to conduct a search. For example, a user can type a search query using his or her device, and a list of relevant search results are returned. If the relevant results do not contain terms or words used by a user, the user may not recognize them as useful or relevant.

Some search queries may yield search results that are generally low in engagement level. A low engagement level may be indicated by, for example, a low average click-through rate, or a low average viewing time across the search results. One reason behind the low engagement level may be that the users sometimes do not recognize that a presented search result is relevant to the search query, because the search result is presented using vocabulary (e.g. terms, phrases or words) that is different from the vocabulary of the user's original search query.

When the user cannot seem to find relevant information quickly using a search query, this may lead to negative user experiences, and may lead to increased workload on customer support staff who may then need to spend time on taking incoming calls from the users that have failed to find answers using the self-help website.

In various examples, the present disclosure describes methods and systems that render a web page containing a list of search results where one or more of the search results are customized and displayed using one or more words from the user's original search query terms, in order to better align the search results with the user's vocabulary. Conveniently in this way, the search results that are deemed most likely to be helpful to a user may appear more relevant to the user.

In some examples, the present disclosure describes a method for generating search results based on a search query, including: receiving a first search query including one or more search terms; obtaining a list of search results for the first search query; determining, based on user interactions with unmodified search results for one or more previous search queries that included the one or more search terms, a first engagement score associated with the first search query; determining that the first engagement score is lower than a first threshold; responsive to determining that the first engagement score is lower than the first threshold, modifying the list of search results by: selecting a first search result from the list of search results, and identifying a candidate word or phrase in the first search result that is interchangeable with a corresponding query word or phrase found in the one or more search terms; and generating a modified list of search results based on the list of search results, the generating including substituting the candidate word or phrase in the first search result with the corresponding query word or phrase; and providing the modified list of search results in response to the search query.

In any of the examples, the first engagement score associated with the first search query may be determined based on at least one of: user click-through rates for the one or more previous search queries that included the one or more of the search terms; average viewing times for results of the one or more previous search queries; records of customer support contacts correlated with the one or more previous search queries; and an average time gap between the presentation of search results for the one or more previous search queries and performing of subsequent related search queries.

In any of the examples, the method may include displaying at least one of a title and a summary of the first search result using the corresponding query word or phrase.

In any of the examples, the method may include: receiving an indication corresponding to a selection of one of the search results; and responsive to receiving the indication, presenting digital content corresponding to the selected search result, wherein the candidate word or phrase is substituted in the digital content with the corresponding query word or phrase.

In any of the examples, the method may include identifying the candidate word or phrase and may include consulting a stored mapping between the candidate word or phrase and the corresponding query word or phrase.

In any of the examples, the mapping may include a plurality of candidate words or phrases and a plurality of corresponding query words or phrases, where each of the plurality of candidate words or phrases maps to one or more of the plurality of corresponding query words or phrases.

In any of the examples, the mapping between a given candidate word or phrase from the plurality of candidate words or phrases and a respective corresponding query word or phrase from the plurality of corresponding query words or phrases may be determined based on at least one of: the given candidate word or phrase is synonymous with the respective corresponding query word or phrase using a dictionary; the given candidate word or phrase is synonymous with the respective corresponding query word or phrase using natural language processing; and the given candidate word or phrase is related with the respective corresponding query word or phrase based on a query log.

In any of the examples, the method may include: determining a second engagement score for the first search query based on user interaction with the modified list of search results; determining that the second engagement score for the first search query exceeds a second threshold; and responsive to determining that the second engagement score for the first search query exceeds the second threshold, storing a mapping relationship between the candidate word or phrase and the corresponding query word or phrase.

In any of the examples, the second threshold may be based on the first engagement score.

In some examples, the present disclosure describes a system including a processor in communication with storage. The processor is configured to execute instructions from the storage to cause the system to: receive a first search query including one or more search terms; obtain a list of search results for the first search query; determine, based on user interactions with unmodified search results for one or more previous search queries that included the one or more search terms, a first engagement score associated with the first search query; determine that the first engagement score is lower than a first threshold; responsive to determining that the first engagement score is lower than the first threshold, modify the list of search results by: selecting a first search result from the list of search results, and identifying a candidate word or phrase in the first search result that is interchangeable with a corresponding query word or phrase found in the one or more search terms, and generating a modified list of search results based on the list of search results, the generating including substituting the candidate word or phrase in the first search result with the corresponding query word or phrase; and provide the modified list of search results in response to the first search query.

The processor may be configured to execute instructions to cause the system to perform any of the methods described herein.

In some examples, the present disclosure describes a computer-readable medium storing instructions that, when executed by a processor of a system, cause the system to: receive a first search query including one or more search terms; obtain a list of search results for the first search query; determine, based on user interactions with unmodified search results for one or more previous search queries that included the one or more search terms, a first engagement score associated with the first search query; determine that the first engagement score is lower than a first threshold; responsive to determining that the first engagement score is lower than the first threshold, modify the list of search results by: selecting a first search result from the list of search results, and identifying a candidate word or phrase in the first search result that is interchangeable with a corresponding query word or phrase found in the one or more search terms, and generating a modified list of search results based on the list of search results, the generating including substituting the candidate word or phrase in the first search result with the corresponding query word or phrase; and provide the modified list of search results in response to the first search query.

The instructions, when executed by the processor, may cause the system to perform any of the methods described herein.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Figure 1:
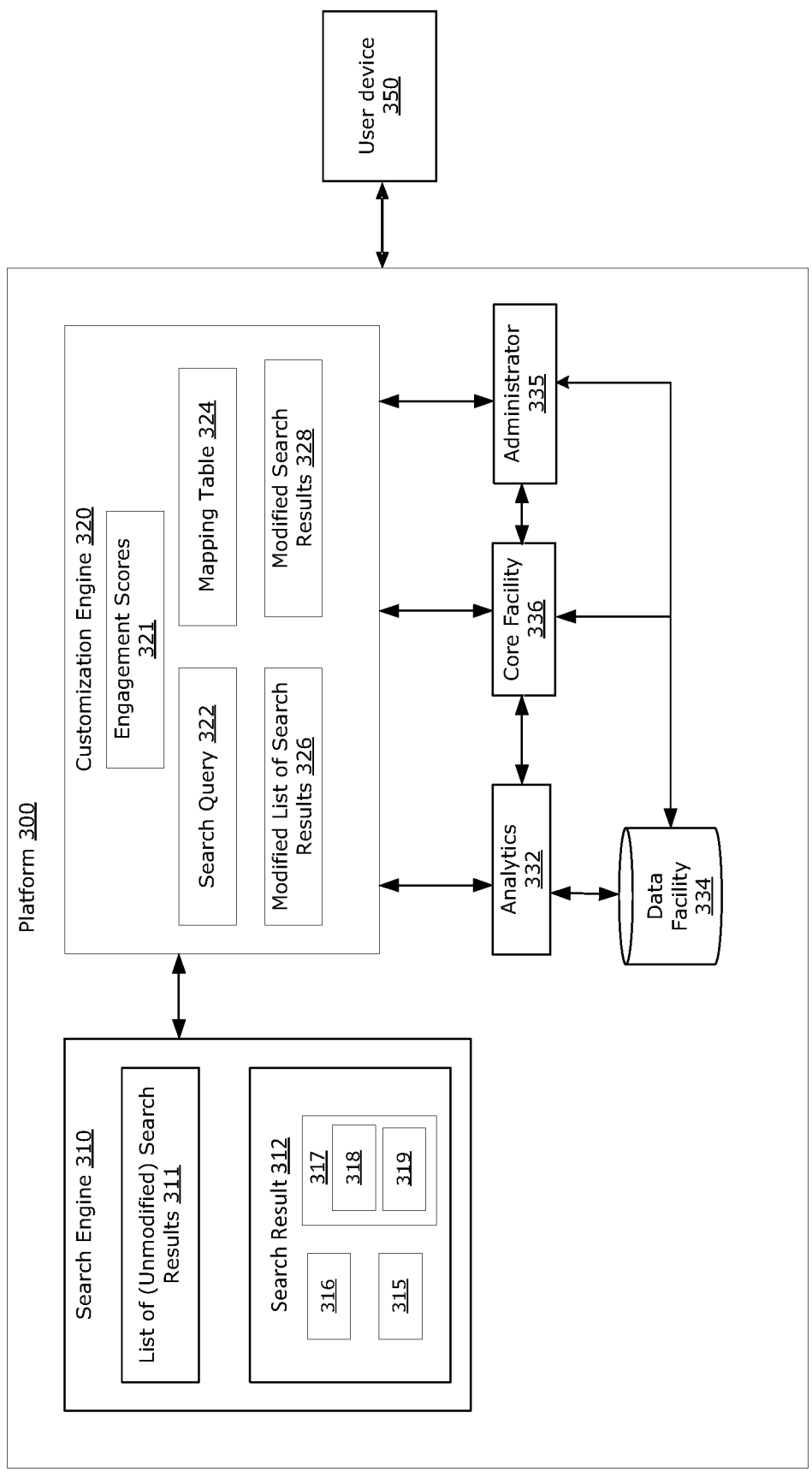
FIG. 1 is a block diagram of an example platform in which examples described herein may be implemented.

FIG. 1 shows a block diagram of an example platform 300 in which examples described herein may be implemented. In particular, FIG. 1 illustrates some example platform 300 having a customization engine 320.

The customization engine 320 may be implemented to help solve the problem of a user not recognizing a potentially helpful search result due to discrepancy or mismatch in vocabulary between the user's original search query and the search results. The customization engine 320 operates by modifying one or more words or phrases in the search result based on the word(s) or phrase(s) used in the user's original search query, and rendering the modified list of search results for display to the user.

Figure 2:
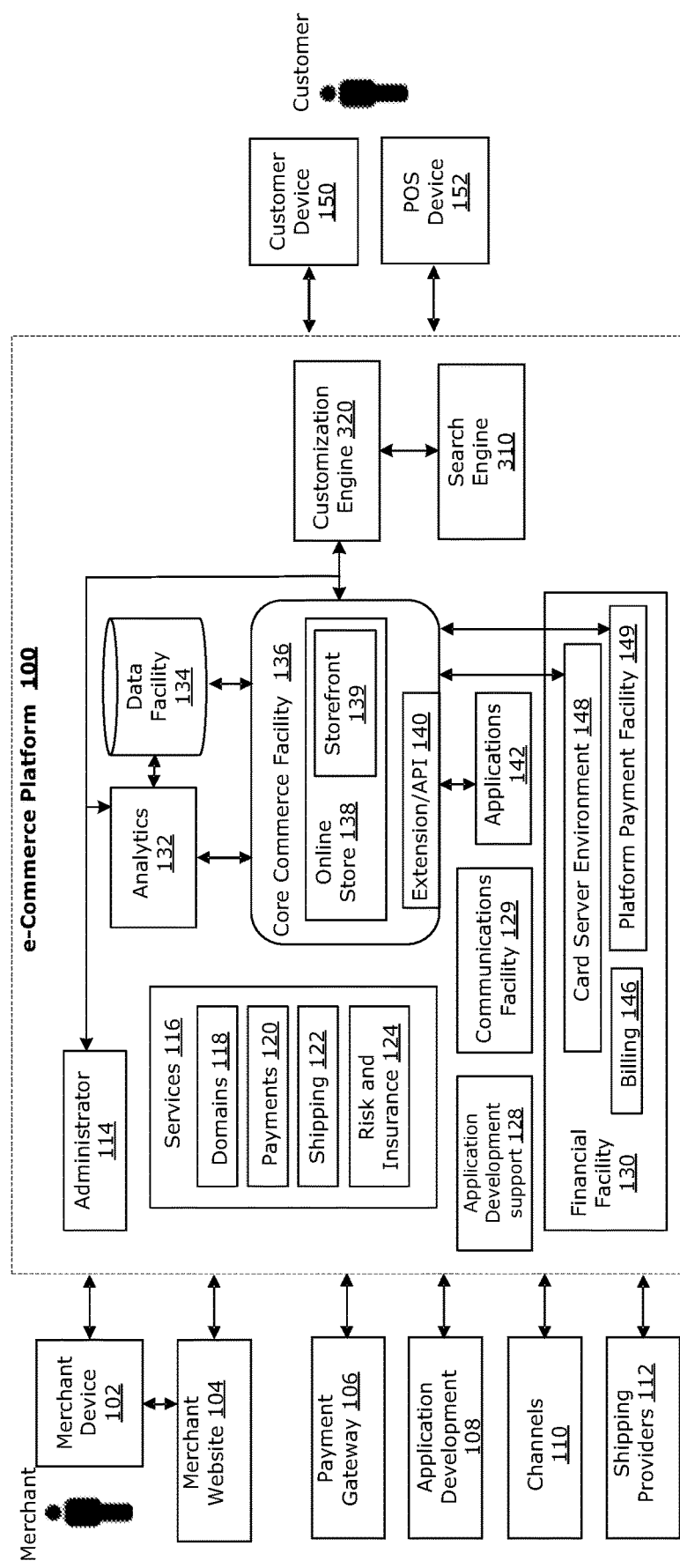
FIG. 2 is a block diagram of an example e-commerce platform, in which examples described herein may be implemented.

In the example of FIG. 1, the platform 300 includes a search engine 310 and a customization engine 320. The customization engine 320 may be configured to provide a modified list of search results in response to a search query received from one or more components of the platform 300, such as, for example, a core facility 336, an administrator facility 335, or received directly from a user device 350 (e.g., a customer device or a merchant device, in the context of e-commerce). A core facility 336 may be part of any general platform or server configured to provide various services over one or more network connections. For example, the core facility 336 may be part of an e-commerce platform 100 as illustrated in FIG. 2. The core facility 336 may accommodate various business logic, and may include or be connected to an administrator facility 335. The core facility 336 may provide centralized management of data, which may be stored in a data facility 334, and used for analytics by an analytics facility 332.

For instance, an administrator interface (e.g., the administrator interface 170 shown in FIG. 3) implemented by the administrator facility 335 (or by the administrator facility 114 in FIG. 2) may provide a search function (e.g., the search bar 174) to a user. The search function may be configured to provide helpful content to the user after having received a search query from the user device 350 via the administrator interface.

Each time the search function is engaged, such as by the core facility 336, a search query 322 from a user may be received from a user device 350, and sent to the customization engine 320, which is configured to provide a modified list of search results 326 in response to the search query 322. In this process, the customization engine 320 can first send the search query 322 to a search engine 310. The search engine 310 is shown in this example as a separate component from the customization engine 320. In some embodiments, however, the search engine 310 may be part of the customization engine 320 (or vice versa). In some embodiments, the search engine 310 may be a third-party search function (e.g., Google™) located outside of the platform 300 and can be called to conduct a search based on the search query 322 by the customization engine 320.

The search engine 310 may be configured to receive the search query 322 from the customization engine 320, and conduct a search based on the search query 322. The search query 322 may contain one or more search terms. A search term may be a single word that can be used to conduct a content-based search. In some embodiments, a search term may be defined to exclude search operators such as, for example, "OR", "AND", wildcard, brackets, dollar sign, file type, site, or other search operators. For example, if a search query is "how to complete banking information", the search terms may include "how", "complete", "banking", and "information". For another example, if a search query is "banking AND information", the search terms may include "banking" and "information". Additionally or alternatively, search terms may exclude common words ("stop words") such as, for example, "or", "and", "the" and/or "a".

Once a search query 322 is received, the search engine 310 conducts a search and returns a list of search results 311 based on the search query 322. A list of search results 311 may be an ordered list of one or more search results 312. The list may have a defined maximum size: e.g., ten or fifteen search results 312 at most.

The search engine may use a number of known algorithms and methods to conduct the search and to generate the list of search results 311, which may be ranked. For example, the search engine 310 may use a ranking algorithm to assign each search result 312 a relevancy score 316 representing how helpful or relevant a search result is based on the search query 322. The search may be conducted based on data and content available on the platform 300. Alternatively or additionally, the search may be conducted based on data and content outside of the platform 300.

In some embodiments, a spell correction may be performed prior to conducting the search by the search engine 310, to correct obvious spelling or grammar mistakes in the search query 322. In this case, the search terms in a search query 322 may be determined based on the corrected search query 322.

The search engine 310 may implement one or more search algorithms that aim to provide search results that are more likely to be clicked and read by a user. For instance, an algorithm may be implemented to conduct the search using context provided by the user device 350, in addition to the search query 322 itself. Context may include, for example, user-supplied information regarding the type(s) of search result 312 desired, such as a file type (e.g. image or news), a date or time range for the search result, language, or a specific website. For another example, search results 312 presented to a user may be results generated from an expanded search. An expanded search may include a search conducted using the original search query 322, and searches using related search terms based on the original search query 322.

A search result 312 may include a web page, a document or any other readable file that can be retrieved or downloaded. The web page, document or readable file may be retrieved or downloaded using a link or URL 315. For example, the search result 312 may be presented in the form of a link 315 and a short snippet 317 of the search result 312. The short snippet 317 may contain a title 318 and optionally a summary 319 of the web page, document or file, which may be downloadable or retrievable when a user clicks on the link 315. The title 318 and summary 319 of the search result 312 may be pre-determined and stored in association with the search result 312 in a database and retrieved by the search engine 310 on demand.

The search results 312 returned by the search engine 310 based on a search query 322 may each be associated with a respective relevancy score 316. The respective relevancy score 316 may be pre-generated and adjusted based on a number of factors, including, for example, a frequency and location of one or more search terms within the content of the search result 312, a past user click-through rate, an average viewing time of the search result 312, if and when a user clicks on other links contained within the search result 312, how many times the search result 312 has been viewed overall, and so on. The relevancy score 316 may be stored in association with each search result 312 and a search query 322. Therefore, a relevancy score 316 may be determined based on the combination of a search result 312 and a search query 322. A search result 312 may have multiple relevancy scores 316, each in associate with a specific search query 322.

In some embodiments, in order to determine relevancy score 316, text-relevance function may be implemented by the search engine 310. For example, Okapi BM25 may be an example ranking function that can be used to determine a relevancy score 316 of one or more search results 312 based on the search query 322. Okapi BM25 (BM being an abbreviation of "best matching") can be used to estimate the relevance of one or more documents based on a given search query; it is based on the probabilistic retrieval framework developed in the 1970s and 1980s by Stephen E. Robertson, Karen Spärck Jones, and others, which is described in detail in the text "Introduction to information retrieval", Manning, C. D., Raghavan, P., & Schütze, H. (2008). *Introduction to information retrieval*. New York: Cambridge University Press, the entirety of which is herein incorporated by reference.

The search engine 310 may be configured to then rank the search results 312 for a given search query 322 based on the relevancy score 316 of each research result 312 for that search query 322. A higher relevancy score 316 indicates that the associated search result 312 is more likely to be helpful to the user. In some embodiments, the search engine 310 may be configured to generate or adjust the relevancy score 316 of a search result 312 based on historical data available to the platform 300. For example, a higher relevancy score 316 may be assigned to a search result 312 when the platform 300 has detected that the user has completed a specific activity (e.g. a task such as adding bank account information) independently after viewing the search result 312, and when the search result 312 contains information regarding the specific activity (e.g. "how to complete user registration") that was performed by the user.

As mentioned, the search engine 310 may be configured to produce a list of search results 311 based on a search query 322 sent by the customization engine 320. The customization engine 320 may be then configured to receive the list of search results 311 and to provide a customized or modified list of search results 326, which may include one or more modified search results 328. Each modified search result 328 is obtained by modifying a respective search result 312 from the list of search results 311. The modified list of search results 326 including one or more modified search results 328 may be rendered and presented on the user device 350.

In some embodiments, the customization engine 320 can be configured to modify the list of search results 311 for every single search query 322. That is, every time the list of search results 311 is generated, the customization engine 320 may proceed to modify the list of search result 311 based on the search query 322 as described in detail herein to produce a modified list of search results 326. In these cases, engagement scores are not necessary.

In other embodiments, the customization engine 320 can be configured to only modify the list of search results 311 for some search queries 322. Each search query 322 may be associated with an engagement score 321 given a specific set of search results 312. The customization engine 320 may be configured to only modify search results when the associated search query 322 has an engagement score 321 below a defined threshold. The threshold may be predefined or predetermined. Additionally or alternatively, the threshold may be manually adjusted, e.g., a value of 80 out of 100. In this case, for search queries 322 associated with an engagement score 321 higher than the threshold, the customization engine 320 may render and present the list of search results 311 from the search engine 310 without modification.

In some embodiments, the engagement score 321 for a search query 322 may be a value determined based on the respective relevancy score 316 of each search result 312 in the list of search results 311. For example, the engagement score 321 may be a computed aggregate value across all the relevancy scores 316 of the search results 312 (e.g., an average of the scores such as, for example, a mean).

A respective engagement score 321 is associated with each search query 322 and its set of search results 312. The engagement score 321 is a measure of success of the search results 312 for that search query 322 without modification. The engagement score 321 may be determined based on user interactions with unmodified search results 312 for one or more previous search queries that included the one or more search terms in the search query 322. For example, if the current search query 322 is "how to close my store", the engagement score 321 for the search query 322 may be based on search results 312 previously generated for one or more search queries that include the terms "close" and "store", including for example, "how to close my store", "how to close a store", "close my store", "close a store", "close store", and so on.

The engagement score 321 for each search query 322 can be a value that is calculated based on factors such as, for example, one or more of: a user click-through rate on one or more of the search results 312; an average viewing time of one or more search results 312; a record of customer support contact after conducting a search using the search query 322 (e.g., zero contact is assigned a high engagement score, any number from 1 to 3 calls to customer support is assigned a medium to low engagement score); and/or the existence of one or more subsequent search queries 322 for the same or related topics, including an average time gap between presenting the search result 312 and receiving a subsequent search query 322 for the same or related topic.

A record of customer support contact (which may be stored in data facility 334) may indicate, for example, if the user has called a customer support staff after conducting a search using a given search query 322. For a user who is signed on to the platform 300, search queries may be logged as a user event, so the platform 300 can maintain a search history (query log) of the user. Then another user event is logged when the user calls a customer support staff and identified during the call by the system or by the customer support staff. The user's account may thereby have an event log indicating a customer support call placed within a time range (e.g. half an hour) of conducting a search. The temporal proximity of a customer support call to conducting a search using a specific search query 322, may be interpreted to measure how likely one or more search results 312 presented have resolved the user's issue embedded within the original search query 322. For example, a time gap of two hours or less may indicate that the presented search results 312 have not resolved the user's ongoing issue, and the search query 322 is thereby assigned a low engagement score, e.g. 20 out of 100. In addition to or as an alternative, transcripts from the customer support call center (e.g., as may be prepared using automated speech recognition) may also indicate the relevance of the call in view of the search results 312, and can be used in determining the appropriate engagement score 321 for the search query 322, for example, by using techniques such as, for example, natural language processing to link the reason of the call to the search query 322.

The engagement score 321 may be further adjusted based on additional factors. For example, the platform 300 may determine that there is an issue associated with the user account that needs to be resolved. if a known issue (e.g. payment issue) of the user has been resolved (e.g., payment has been made) after conducting a search query 322, and the search query 322 is related to making payments (e.g. "how to make payment" or "payment"), then the customization engine 320 may infer that the search results 312 presented for the search query 322 helped to resolve the problem and the search query 322 may therefore assigned a higher engagement score 321 (e.g., 80 out of 100).

In some embodiments, for each search query 322 that has a low engagement score 321 as defined above, a search result 312 may be chosen to be a candidate search result. For instance, for the search query "how to close my store", the candidate search result may be a web page titled "cancel my account". The candidate search result may be chosen based on one or more criteria, which may include: a relevancy score 316 for the search result 312 above a certain threshold, has been viewed by a minimum number of distinct users in the past, has been identified by users as being most helpful, and/or any other criteria. In some embodiments, the customization engine 320 may choose a search result 312 to be a candidate search result based strictly on the relevancy score 316 alone. For example, the customization engine 320 may choose the search result 312 with the highest relevancy score 316 for the given search query 322 to be the candidate search result.

In some embodiments, more than one candidate search results may be identified, for example, two or three search results satisfying one or more criteria. For example, the customization engine 320 may choose the search results 312 with the top two or three relevancy scores 316 for the given search query 322 to be the candidate search results.

Once the candidate search results are identified, the customization engine 320 may proceed to modify each candidate search result by identifying a candidate word or phrase in the candidate search result that is interchangeable with a corresponding query word or phrase found in the original search query 322, and then substituting the candidate word or phrase in the candidate search result with the corresponding query word or phrase found in the original search query 322, as further elaborated below. The modified search results 328 can be stored in association with each original search query 322 and the corresponding search result 312.

The customization engine 320 may then generate and present a modified list of search results 326 for display at the user device 350. The modified list of search results 326 may include modified search results 328 and unmodified search results 312. A modified search result 328 may be associated with a relevancy score 316 identical to that of the corresponding original search result 312. The modified list of search results 326 may be ranked based on the respective relevancy score 316 of the modified search results 328 and the relevancy score 316 of the unmodified search results 312.

As mentioned, a given candidate search result, which is the original (i.e., unmodified) search result 312 from the list of search results 311, may have a title (also known as heading) 318, a summary 319, and a full body content which may be presented when the user clicks on the link 315 of the search result 312. The customization engine 320 may examine each word (ignoring stop words like "a", "the", "of", etc.) in at least the title 318, and optionally, the summary 319 and the full body content of the search result 312, and may determine, from these words, one or more candidate word or phrase that may be substituted by one or more corresponding query word or phrase from the original search query 322 used by the user. For the purpose of this disclosure, a word is a single word in a language (e.g. English or French), and a phrase is defined to contain at least two words or more. In some embodiments, the stop words such as "a", "the", "of" may also be taken into consideration when examining the words or phrases to find one or more candidate word(s) or phrase(s) for substitution.

For example, a word frequency histogram for a candidate search result may indicate one or more words or phrases that appear most frequently in the title, summary, or full body content of the candidate search result. The customization engine 320 may use a publicly available reference, such as an online dictionary, a vocabulary database or a word map, to check if any corresponding query word or phrase in the original search query 322 may be a suitable substitution for the one or more candidate word or phrase that appear most frequently in the candidate search result. A suitable substitution may be indicated by the corresponding query word or phrase in the original search query 322 being synonymous with, or have a similar semantic meaning with, a candidate word or phrase in the candidate search result.

In addition, natural language processing may be used to try to match one or more corresponding query words or phrases in the original search query 322 with one or more candidate words or phrases in a candidate search result. For example, natural language processing algorithms may be implemented by the customization engine 320 to identify a concept or idea based on the search query 322 using suitable techniques such as, for example, latent semantic indexing, co-occurring terms or synonyms. When the identified concept or idea also exists in the candidate search result, the concept or idea may be replaced by the one or more corresponding query word or phrase in the original search query 322.

In some embodiments, the customization engine 320 may identify the candidate word or phrase by consulting a mapping relationship, which may be stored as a mapping table 324 containing a plurality of candidate words or phrases in past candidate search results and a plurality of corresponding query words or phrases in past search queries 322, where each of the plurality of candidate words or phrases maps to one or more of the plurality of corresponding query words or phrases. For example, a search query 322 may be "close my store", where the corresponding candidate word or phrase in a candidate search result may be "cancel my account". Therefore, the candidate word "cancel" maps to the corresponding query word "close", the candidate word "account" maps to the corresponding query word "store", and the candidate phrase "cancel account" maps to the corresponding query phrase "close store" or "close account".

For example, each entry in the mapping table 324 may include one or more candidate word or phrases, a corresponding (interchangeable) query word or phrase for each respective candidate word or phrase, and optionally, one or more fields such as original search query 322, candidate search results (CSR), demographic information of the user, geographical information of the user, and so on. As an example, below is an example embodiment of a mapping table 324.

| Original Search Query | Candidate Search Result ("CSR") | Demographic | Region | Candidate Word or Phrase | Corresponding Query Word or Phrase |
| --- | --- | --- | --- | --- | --- |
| how to close my store | link to "cancel my account" | All (or youth or elder, etc.) | East coast | cancel<br>cancel + account | close<br>close + store |
| how to close my store | link to "pause my account" | All (or youth or elder, etc.) | West coast | account<br>pause + account | store<br>pause + store |

In some embodiments, the mapping table 324 can accommodate regional differences among users. For example, when a word or phrase in the original search query 322 appears to have multiple meanings, the customization engine 320 may check a user's account setting to choose the most appropriate meaning for the word or phrase. For example, the word "college" tends to mean university in the United States, while it may refer to a college of applied arts or technology in Commonwealth countries (e.g. Canada).

In some embodiments, the mapping between a given candidate word or phrase and a respective corresponding query word or phrase, as shown in a mapping table 324, may be determined based on a number of factors such as, for example, one or more of: the given candidate word or phrase being synonymous with the respective corresponding query word or phrase according, for example, to a dictionary definition; the given candidate word or phrase is synonymous with the respective corresponding query word or phrase using natural language processing; and/or the given candidate word or phrase being related to the respective corresponding query word or phrase based on a query log, as described next.

In some embodiments, when a user is signed on to the platform 300, his or her search queries may be logged as a user event. In this manner, the platform 300 can maintain the search history (query log) of all users who have signed onto the platform 300 and used the search function. The query logs may be saved in the data facility 334 and analyzed to determine if a query word or phrase in the search query 322 is correlated with or related to a candidate word or phrase. For instance, when a user has entered two or more search queries in a short span of time (e.g. within 10 minutes), it may be an indication that a word or phrase in the first search query ("the first query word or phrase") may be a suitable substitution for a word or phrase in the second search query ("the second query word or phrase"), and vice versa. Often, when a user enters consecutive search queries, the first search query can be considered as the original query, and the subsequent query or queries can be considered as the revised query or queries.

As an example, when the query log indicates that the a user has entered "when is Raptors game tonight" as the first search query, and subsequently entered "when is NBA game tonight" as the second search query, it may be determined that in the context of games, "Raptors" and "NBA" may have a mapping relationship, and may be stored in a mapping table 324 for future use.

As another example, when a user has entered "Orlando theme park" as the first search query, and subsequently entered "Disney World" as the second search query, it may be determined that in the context of parks, "Orlando" and "Disney", or "Orlando" and "Disney World", may have a mapping relationship, and may be stored in a mapping table 324 for future use.

The mapping table 324 may be saved in some store as, for example, a text file, an XML file, a SQL file, in a database, as an in-memory data structure (e.g. dictionary, hash table), and/or in any other data storage format/store that provides insertion, deletion, and lookup capabilities.

In some embodiments, the customization engine 320 may first look up one or more query words or phrases found in the search query 322 in the mapping table 324, and determine if a word or phrase is found to exist in the mapping table 324 and maps to the query word or phrase from the search query 322. When the customization engine 320 finds a candidate word or phrase in the mapping table 324 based on the query word or phrase in the search query 322, the customization engine 320 can search the text of the candidate search result to see if the candidate word or phrase found in the mapping table indeed exists in the candidate search result. When the candidate word or phrase exists in the candidate search result, the corresponding word or phrase in the search query 322 may be used to substitute the respective candidate word or phrase in the candidate search result.

In some embodiments, the customization engine 320 may perform the substitution of candidate words or phrases without using a mapping table 324. For example, the customization engine 320 may use a dictionary available online (or a dictionary stored on platform 300) to find one or more synonymous words for each query word in the search query 322, and look up each of the one or more synonymous words in the candidate search result to see if any word in the candidate search result matches the respective synonymous word. In this manner, the customization engine 320 can find a candidate word or phrase to be synonymous with a query word or phrase, and proceed to substitute the candidate word or phrase in the candidate search result accordingly with the query word or phrase.

For another example, the customization engine 320 may use a natural language processing algorithm to try to find one or more context based synonymous word or phrase, in the full body content of the candidate search result, for each query word or phrase in the search query 322, and if any context based synonymous word or phrase is found, proceed to substitute the context based synonymous word or phrase (i.e., the candidate word or phrase) in the candidate search result accordingly with the corresponding query word or phrase.

As mentioned, in some embodiments, the customization engine 320 may cause the platform 300 to display at least one of a title and a summary of the modified search results 328 using the corresponding query word or phrase when presenting the modified list of search results 326 on the user device 350.

For example, in some embodiments, the customization engine 320 may receive an indication (e.g. a signal), from a user device 350, corresponding to a user selection of one of the modified search results 328, and responsive to receiving the indication, presenting digital content corresponding to the selected search result 328, where each occurrence of the candidate word or phrase in the digital content is substituted with the corresponding query word or phrase from the search query 322. The user selection may be, for example, a selection to view the full body content of the modified search result 328 in the current or a separate browser, or a selection to expand a modified search result 328 in the current browser, such as, for example, as a section or overlay.

When the user selection is for expanding a search result in place as a section or overlay, a digital content of the modified search result 328, which has been generated based on the original digital content of the corresponding search result 312, can be sent by the customization engine 320 to the user device 350. The digital content of the modified search result 328 may include at least a title and optionally a summary. Each occurrence of the candidate word or phrase in the title and optionally the summary has been substituted with a corresponding query word or phrase from the search query 322 in the modified search result 328. In some implementations, the customization engine 320 may create a new file (e.g., a text file) containing the digital content of the modified search result 328, each time a user selection is received from the user device 350. Such a file may be sent (e.g., by the customization engine 320) to the user device 350 in response to receiving the user selection.

When the user selection is for viewing the full body content of the modified search result 328 in the current or a separate browser, the digital content sent by the customization engine 320 to the user device 350 may include the entire digital content of the modified search result 328, in which each occurrence of the candidate word or phrase in the entire digital content of the modified search result 328 has been substituted with a corresponding query word or phrase from the search query 322.

In some embodiments, when the customization engine 320 has determined that a candidate word or phrase in the search result 312 is interchangeable with a corresponding query word or phrase found in the search query 322 (e.g., using a dictionary or a natural language processing algorithm such as word32vec or Latent Semantic Analysis), and when the candidate word or phrase and the corresponding query word or phrase are not yet stored as in a mapping table as interchangeable words or queries yet, the customization engine 320 may be further configured to store the mapping relationship between the candidate word or phrase and the corresponding query word or phrase in the mapping table 324.

For example, table 324 may have two components, including a first component stored in the random access memory (RAM) and a second component stored in a memory structure elsewhere (e.g., word2vec or redis). When the customization engine 320 has determined that a candidate word or phrase in the search result 312 is interchangeable with a corresponding query word or phrase found in the search query 322, the customization engine 320 may further store the mapping relationship between the candidate word or phrase and the corresponding query word or phrase in the first component of mapping table 324 in RAM.

For example, the customization engine 320 may receive user interactions of the modified search results 328, determine a second engagement score for the search query 322 based on user interaction with the modified search results 328, determine that the second engagement score 321 for the search query 322 exceeds a second threshold, and store a mapping relationship between the candidate word or phrase in the candidate search result and the corresponding query word or phrase in the search query 322 (e.g. in the mapping table 324) when the second engagement score exceeds the second threshold.

The second threshold may be based on the first engagement score, e.g., it needs to be higher than the first engagement score. The user interactions may include for example, user click-through rates for one or more of the modified search results 328; average viewing times for results of one or more of the modified search results 328; records of customer support contacts correlated with one or more of the modified search results 328; or an average time gap between the presentation of one or more of the modified search results 328 and performing of subsequent related search queries.

In some embodiments, as an optional feature, to further provide helpful content to a user's search query 322 (e.g., "how to close my store"), the customization engine 320 may, optionally, update the original search query 322 by modifying it using one or more candidate word or phrase, and send the updated search query (e.g. "cancel my account") to the search engine 310 for another round of search based on the updated search query. This updated search query may further generate a new candidate search result (e.g. "pause my account") that has the highest relevancy score 316 among all the search results 312 based on the updated search query.

The customization engine 320 can then, optionally, determine that one or more candidate words or phrase (e.g. "pause", "pause+account") in the new candidate search result may be substituted by one or more query word or phrase in the original search query 322 (e.g. "close", "close+store"). The mapping table 324 may be updated to record the mapping relationship between the candidate word "pause" and the corresponding query word "close". The new candidate search result may be sent, along with the previous set of modified search results 328 obtained based on the original search query 322, to the user device 350 for presenting to the user, where each occurrence of the candidate word "pause" is replaced with the corresponding word or phrase "close" in the new candidate search result.

The customization engine 320 can be configured to, for each search query 322 received from a user device 350, keep conducting the searches and updating the search query 322 each time, until it has performed a minimum number of rounds of searches, generated a minimum number of candidate search results, or until it has found at least a minimum number of candidate search results that have an relevancy score 316 above a minimum threshold.

With reference to FIG. 2, an embodiment e-commerce platform 100 is depicted for providing merchant products and services to customers. The e-commerce platform 100 may include a search engine 310 and a customization engine 320 with similar functionalities to those described above in relation to platform 300 in FIG. 1. While the disclosure throughout contemplates using the apparatus, system, and process disclosed to purchase products and services, for simplicity the description herein will refer to products or offerings. All references to products or offerings throughout this disclosure should also be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, it should be understood that aspects of the e-commerce platform 100 may be more generally available to support users in an e-commerce environment, and all references to merchants and customers throughout this disclosure should also be understood to be references to users, such as where a user is a merchant-user (e.g., a seller, retailer, wholesaler, or provider of products), a marketer-user (e.g., a marketing agent, an external marketing service provider, or a self-marketing merchant), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a merchant may be a marketer, or a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processing device and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an online business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 3:
FIG. 3 is an example homepage of an administrator, which may be accessed via the e-commerce platform of FIG. 2.

FIG. 3 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 3. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 2. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, backpressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 4). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 4:
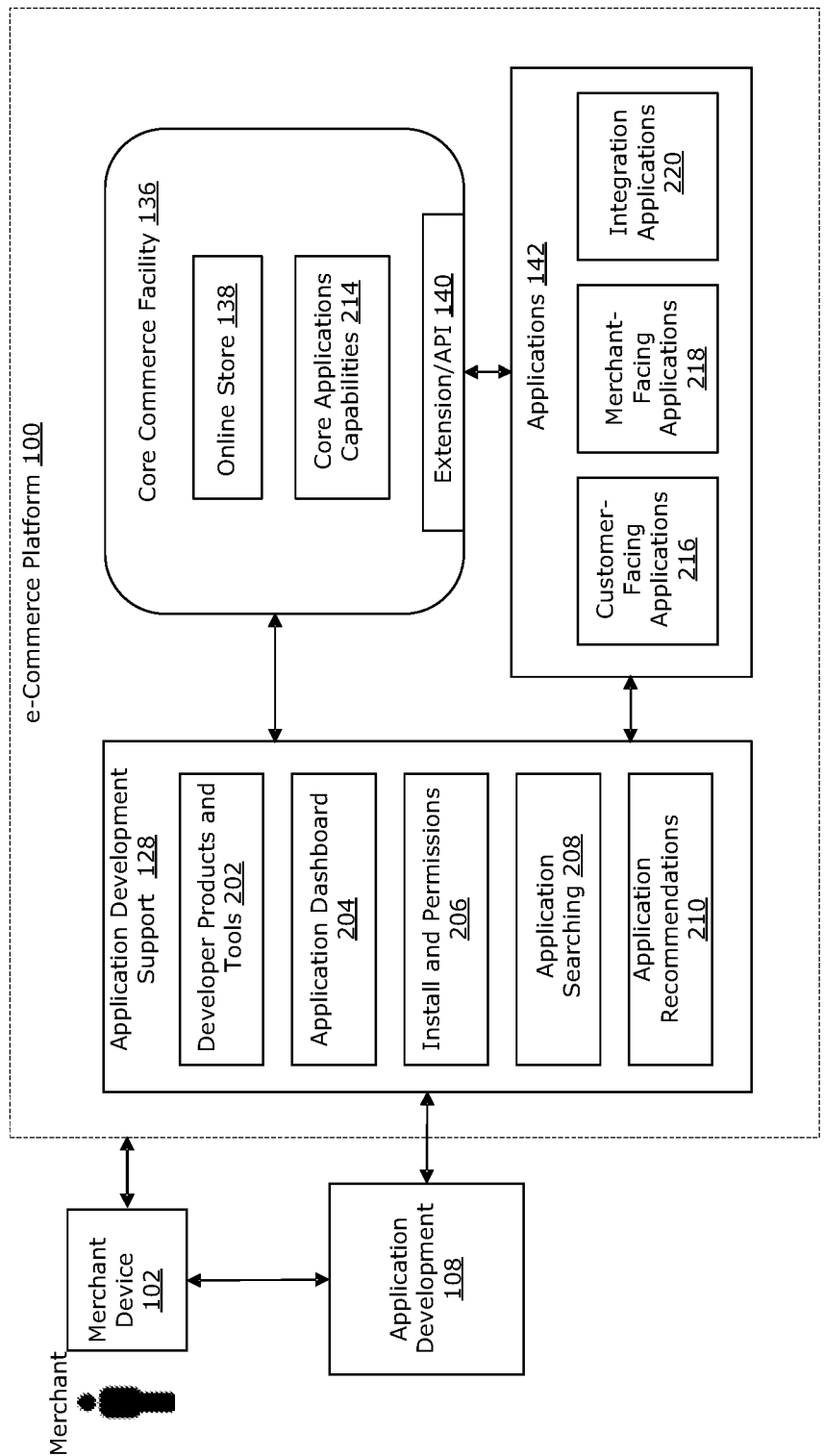
FIG. 4 is another block diagram of the e-commerce platform of FIG. 2, showing some details related to application development.

Reference is made to FIG. 4, which is another depiction of the e-commerce platform 100. FIG. 4 omits some details that have been described with reference to FIG. 2, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 5:
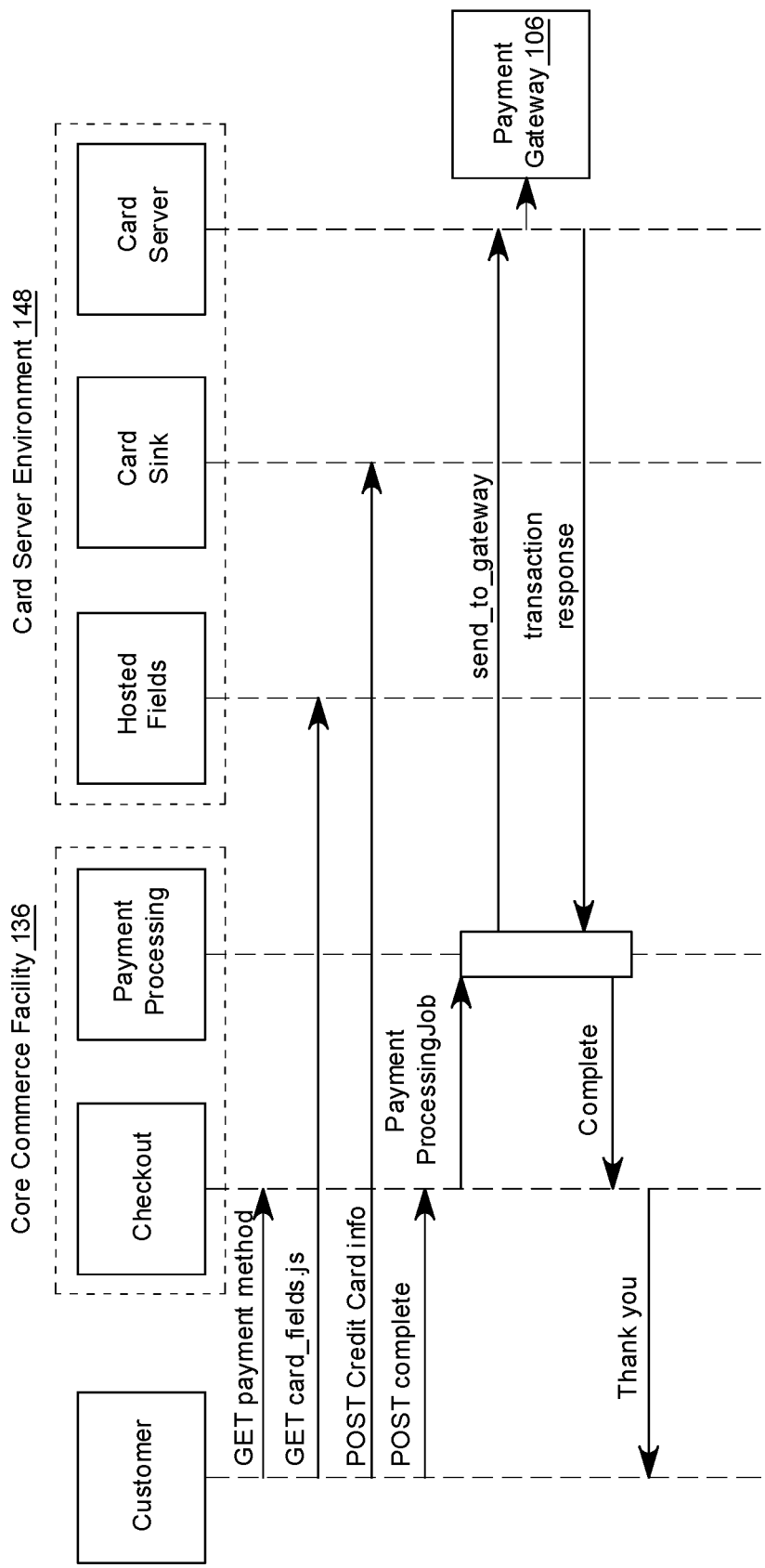
FIG. 5 shows an example data flow that may take place when a purchase is made using the e-commerce platform of FIG. 2.

FIG. 5 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

Figure 6:
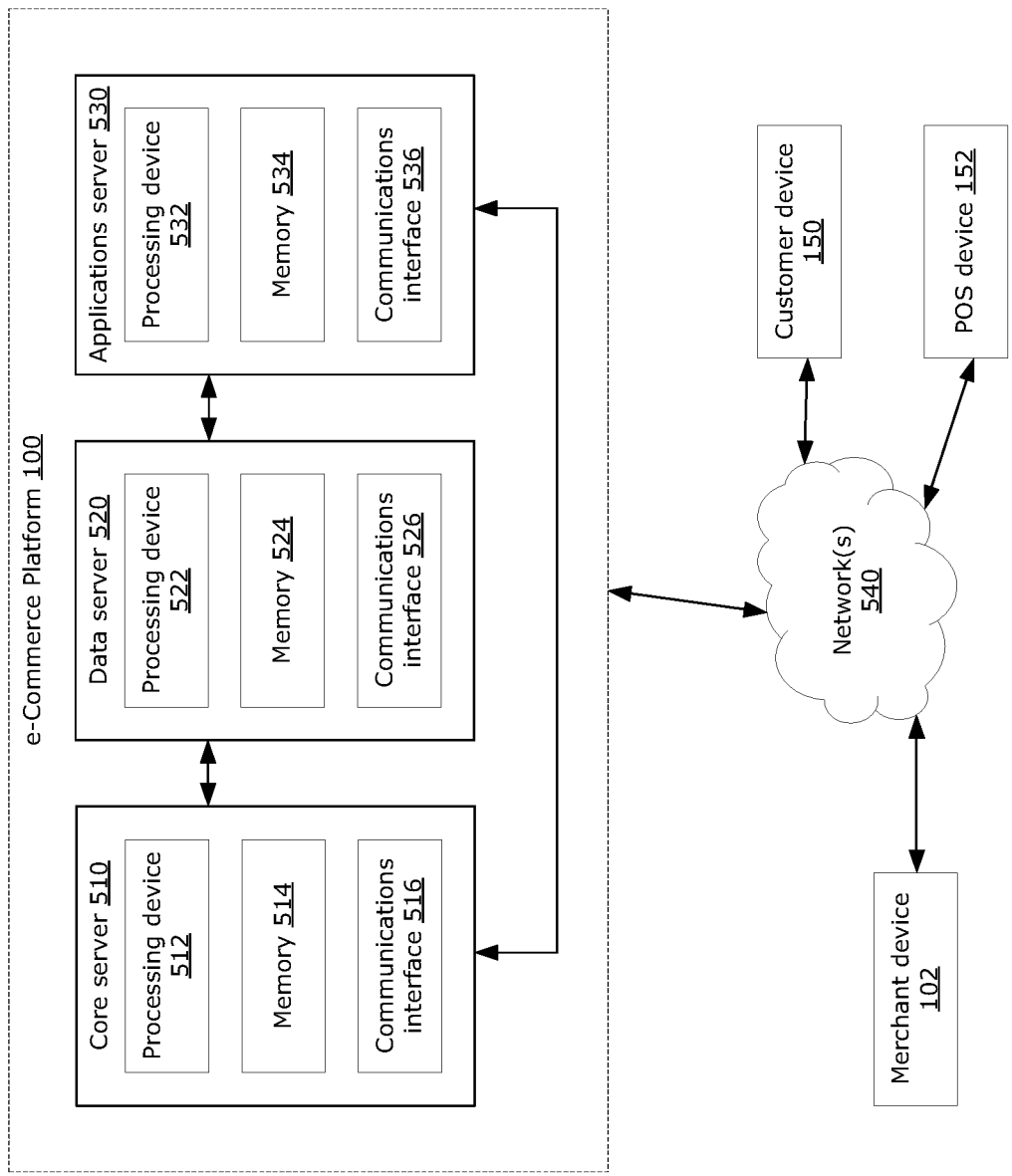
FIG. 6 is a block diagram illustrating an example implementation of the e-commerce platform of FIG. 2.

FIG. 6 is a block diagram of an example hardware configuration of the e-commerce platform 100. It should be noted that different components of the e-commerce platform 100 (e.g., the data facility 134, analytics 132, core commerce facility 136 and applications 142) may be implemented in separate hardware or software components, on a common hardware component or server or configured as a common (integrated) service or engine in the e-commerce platform 100. In the example of FIG. 6, the e-commerce platform 100 includes a core server 510, a data server 520 and an applications server 530, which are each in communication with each other (e.g., via wired connections and/or via wireless intranet connections). Each of the servers 510, 520, 530 include a respective processing device 512, 522, 532 (each of which may be, for example, a microprocessor, graphical processing unit, digital signal processor or other computational element), a respective memory 514, 524, 534 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 516, 526, 536 (each of which may include transmitter, receiver and/or transceiver for wired and/or wireless communications). The core server 510 may store instructions and perform operations relevant to core capabilities of the e-commerce platform, such as providing the administrator 114, analytics 132, core commerce facility 136, services 116 and/or financial facility 130, among others. The data server 520 may be used to implement the data facility 134, among others. The applications server 530 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 540 (e.g., wired and/or wireless networks, including a virtual private network (VPN), the Internet, and the like).

Although FIG. 6 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 514, 524, 534 may be replaced with external storage or cloud-based storage, among other possible modifications.

Figure 7:
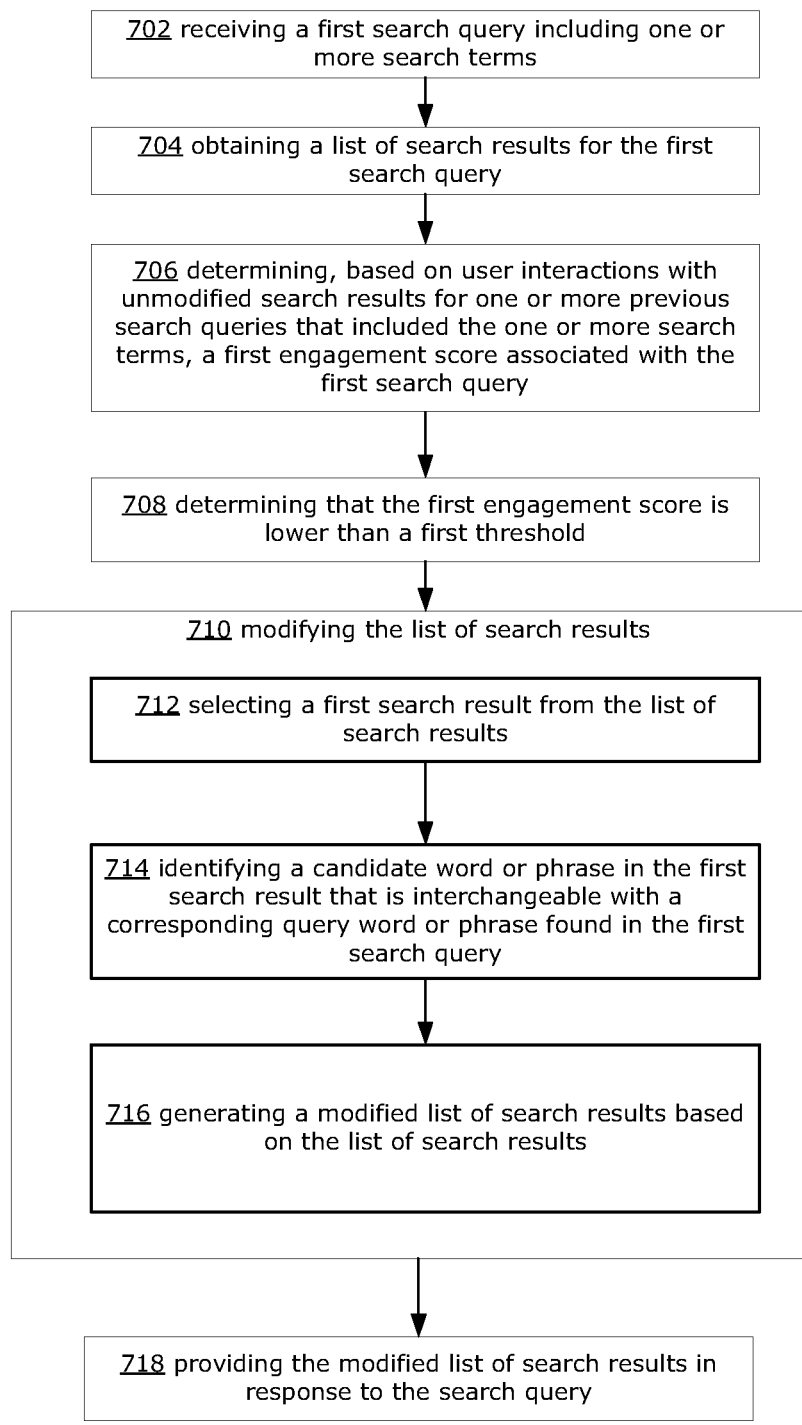
FIG. 7 is a flowchart illustrating an example method generating search results based on a search query.

FIG. 7 is a flowchart illustrating an example method 700 for generating modified search results 328 based on a given search query 322. The example method 700 may be performed by the e-commerce platform 100, for example using the customization engine 320. More broadly, the example method 700 and/or methods analogous thereto may be employed in the context of platforms such as, for example, the example platform 300.

At operation 702, a first search query 322 is received. The first search query 322 may include one or more search terms. For example, the first search query 322 may be "how to close my store", and the search terms may be "how", "close", "my", and "store".

At operation 704, a list of search results 311, which are unmodified, are obtained from a search engine 310 based on the first search query 322. The list of search results 311 may include, or point to, one or more (unmodified) search results 312. Each search result 312 may be associated with a relevancy score 316 indicating its relevance based on the search query 322. Each search result 312 may have a link or URL 315 that when clicked on, retrieves or downloads a web page, a document, or a file containing digital content that is often referred to as the full body content. Each search result 312 may also have a title 318 and a summary 319. A title 318 may be a heading or a sub-heading. A summary 319 may be a brief summary of the full body content. Both the title 318 and the summary 319 may be stored in association with the search result 312 on the e-commerce platform 100.

In some embodiments, the search engine 310 may be configured to generate or adjust the relevancy score 316 of a search result 312 based on historical data available to the platform 300 or the e-commerce platform 100. For example, a higher relevancy score 316 may be assigned to a search result 312 when the e-commerce platform 100 has detected that the user has completed a specific activity (e.g. a task such as adding bank account information) independently after viewing the search result 312, and when the search result 312 contains information regarding the specific activity (e.g. "how to add bank account information") that was performed by the user. For another example, a lower relevancy score 316 may be assigned to a search result 312 when the e-commerce platform 100 has detected that the user has called a customer service agent regarding a specific task after viewing the search result 312, and when the search result 312 contains information regarding the specific task.

Analysis of historical or real-time data stored in the data facility 334, 134 (e.g., by the analytics facility 332 using analytical algorithms such as machine-learned algorithms or classical algorithms) can identify each user's contextual information to further refine the ranking of the search results 312. For example, based on the geographical location of the user device 350 used by the user to enter the search query 322, the search engine 310 may rank a search result 312 that has information specific to the geographical region higher than some search results that do not have information specific to the specific geographical location. For another example, based on a user's historical visit information (e.g., websites visited by the user device 350 previously, which may be identified using cookies), the search engine 310 may rank a search result 312 that has information more relevant to the user's historical browsing pattern higher than some search results that are not as relevant to the user's historical browsing pattern.

A geographic region may range in size from a local neighborhood (e.g., a few streets), a municipality (e.g., a city or town), a state or province within a country, to a country, for example. For example, various online activity on the platform 300 or the e-commerce platform 100 (e.g., searching for products, viewing product pages, viewing product reviews, etc.) may be analyzed in the aggregate (e.g., by the analytics facility 332, 132) to identify geographic trends in consumer interest in a product or product category. This analysis may be used by the search engine 310 to rank the search results 312 accordingly.

At operation 706, based on user interactions with the unmodified search results 312 for one or more previous search queries that included the one or more search terms, a first engagement score 321 associated with the first search query 322 may be determined. The first engagement score 321 may be determined based on a number of factors, including but not limited to: a user click-through rate on one or more of the search results 312; an average viewing time of one or more search results 312; a record of customer support contact after conducting a search using the search query 322 (e.g., zero contact is assigned a high engagement score, any number from 1 to 3 calls to customer support is assigned a medium to low engagement score); and the existence of one or more subsequent search queries 322 for the same or related topics, including an average time gap between presenting the search result 312 and receiving a subsequent search query 322 for the same or related topic. The engagement score 321 for a search query 322 is typically associated with a set of search results 312 and indicates how engaged the users have been when presented with the search results 312, as well as how successful the search results 312 have been in resolving past user issues.

At operation 708, when it is determined that the first engagement score 321 is lower than a first threshold (e.g., 80 out of 100), the list of search results 312 are modified using process 710. In some embodiments, regardless of the engagement score 321, each list of search results 311 is modified in accordance with process 710, prior to being sent to the customer device 150, in which case operation 708 may be omitted and the method 700 may proceed to process 710 following operation 706.

As part of process 710, the list of search results 312 may be modified by: at operation 712, selecting a first search result from the list of search results 312. The first search result may be referred to as a candidate search result and can be selected based on a relevancy score 316 of each of the search results 312 in the list of search results 311. For example, the first search result may be the search result having the highest relevancy score 316 for the search query 322 based on historical data. In some embodiments, more than one candidate search results may be selected. For example, the two or three search results 312 having the highest relevancy scores 316 may be selected as the candidate search results for the search query 322.

At operation 714, which is also part of process 710, a candidate word or phrase in the first (candidate) search result 312 may be identified. The candidate word or phrase in the first search result 312 can be a word or phrase interchangeable with a corresponding query word or phrase found in the first search query 322 (e.g. "close", "store" from the example above). An example method of selecting the candidate word or phrase is by looking at the most frequently appeared word or phrase in the full body content of the first search result 312. Another example method of selecting the candidate word or phrase is by using natural language processing to identify a main concept or idea behind the first search result 312. Yet another example method of selecting the candidate word or phrase is by looking up the candidate word or phrase in a mapping table 324 stored on the e-commerce platform 100. The corresponding query word or phrase from the first search query 322 may be determined by finding a word in the search query 322 that is synonyms or otherwise interchangeable to a candidate word in the first search result 312 using a dictionary, based on user logs, or based on the mapping table 324, as described in detail above. This process may be repeated for each candidate search result when there are multiple candidate search results.

At operation 716, which is also part of process 710, a modified list of search results 326 is generated based on the list of search results 311, where the modified list of search results 326 includes a set of modified search results 328. The generation of the modified search results 328 may include substituting the candidate word or phrase in the first search result 312 with the corresponding query word or phrase from the search query 322.

At operation 718, the modified list of search results 326, which includes one or more modified search result 328 and possibly one or more unmodified search result 312, is provided to the user device 350 in response to the search query 322. In some embodiments, the e-commerce platform 100 may cause the customer device 150 to display at least one of a title and a summary of the modified search results 328 using the corresponding query word or phrase when presenting the modified list of search results 326 on the user device 350.

For example, in some embodiments, the customization engine 320 may receive an indication (e.g. a signal), from a user device 350, corresponding to a user selection of one of the modified search results 328, and responsive to receiving the indication, presenting digital content corresponding to the selected search result 328, where each occurrence of the candidate word or phrase in the digital content is substituted with the corresponding query word or phrase from the search query 322. The user selection may be, for example, a selection to view the full body content of the modified search result 328 in the current or a separate browser, or a selection to expand a modified search result 328 in the current browser, as a section or overlay.

When the user selection is for expanding a modified search result 328 in place as a section or overlay, the digital content sent by the customization engine 320 to the user device 350 may include at least a title and optionally a summary of the modified search result 328, in which case each occurrence of the candidate word or phrase in the title and optionally the summary has been substituted with a corresponding query word or phrase from the search query 322.

When the user selection is for viewing the full body content of the modified search result 328 in the current or a separate browser, the digital content sent by the customization engine 320 to the user device 350 may include the entire digital content of the modified search result 328, in which case each occurrence of the candidate word or phrase in the entire digital content of the modified search result 328 has been substituted with a corresponding query word or phrase from the search query 322.

While existing approaches generate or rank search results based on past query log and past users' reaction to the search results (e.g. click-through rate or average viewing time), the present disclosure provides an improved user experience by, prior to rendering the list of search results, customizing the digital content (e.g., title, summary, or the full body content) of a search result based on the vocabulary of the original search query. Using words from the original search query in displaying the modified search results increases the likelihood the user engages with the search result, and thereby reducing the likelihood a user calls the customer support center when he cannot seem to find the search results that can help solve his issue.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A computer-implemented method for generating search results based on a search query, the method comprising:
receiving by a processor, from a user device, a first search query including one or more search terms;
obtaining, by the processor, a list of search results for the first search query;
determining by the processor, based on tracking previous online user interactions with a set of unmodified search results for one or more previous search queries that included the one or more search terms, a first engagement score associated with the first search query, wherein the first engagement score represents overall previous online user engagement with the set of unmodified search results;
determining, by the processor, that the first engagement score is lower than a first threshold;
responsive to determining that the first engagement score is lower than the first threshold, modifying, by the processor, the list of search results by:
selecting, by the processor, a first search result from the list of search results;
identifying, by the processor, a candidate word or phrase in the first search result that is interchangeable with a corresponding query word or phrase found in the one or more search terms; and
generating, by the processor, a modified list of search results based on the list of search results, the generating including substituting the candidate word or phrase in the first search result with the corresponding query word or phrase; and
providing, by the processor, the modified list of search results to the user device in response to the first search query.

2. The computer-implemented method of claim 1, wherein the first engagement score associated with the first search query is determined based on tracked previous online user interactions including at least one of:
user click-through rates for the one or more previous search queries that included the one or more of the search terms;
average viewing times for results of the one or more previous search queries;
records of customer support contacts correlated with the one or more previous search queries; or
an average time gap between the presentation of search results for the one or more previous search queries and performing of subsequent related search queries.

3. The computer-implemented method of claim 1, wherein providing the modified list of search results comprises causing the user device to display at least one of a title or a summary of the first search result using the corresponding query word or phrase.

4. The computer-implemented method of claim 1, further comprising:
receiving, by the processor, an indication corresponding to a selection of a selected one of the search results;
responsive to receiving the indication, generating, by the processor, modified digital content from original digital content corresponding to the selected one search result, wherein, in the modified digital content, the candidate word or phrase is substituted in the digital content with the corresponding query word or phrase; and
providing, by the processor, the modified digital content to the user device.

5. The computer-implemented method of claim 1, wherein identifying the candidate word or phrase includes consulting, by the processor, a stored mapping between the candidate word or phrase and the corresponding query word or phrase.

6. The computer-implemented method of claim 5, wherein the mapping includes a plurality of candidate words or phrases and a plurality of corresponding query words or phrases, wherein each of the plurality of candidate words or phrases maps to one or more of the plurality of corresponding query words or phrases.

7. The computer-implemented method of claim 6, wherein the mapping between a given candidate word or phrase from the plurality of candidate words or phrases and a respective corresponding query word or phrase from the plurality of corresponding query words or phrases is determined based on at least one of:
   the given candidate word or phrase being synonymous with the respective corresponding query word or phrase using a dictionary;
   the given candidate word or phrase being synonymous with the respective corresponding query word or phrase using natural language processing; or
   the given candidate word or phrase being related to the respective corresponding query word or phrase based on a query log.

8. The computer-implemented method of claim 1, further comprising:
   determining, by the processor, a second engagement score for the first search query based on tracked online user interaction, via the user device, with the modified list of search results, the second engagement score representing overall user engagement with the modified list of search results;
   determining, by the processor, that the second engagement score for the first search query exceeds a second threshold; and
   responsive to determining that the second engagement score for the first search query exceeds the second threshold, storing, by the processor, a mapping relationship between the candidate word or phrase and the corresponding query word or phrase.

9. The computer-implemented method of claim 8, wherein the second threshold is based on the first engagement score.

10. The method of claim 1, further comprising:
    generating a modified search query by modifying the first search query using the candidate word or phrase to substitute for the corresponding query word or phrase;
    obtaining a second list of search results for the modified search query, the second list of search results including at least one candidate search result omitted from the list of search results obtained for the first search query; and
    including the at least one candidate search result in the modified list of search results that is provided to the user device.

11. A system for generating search results based on a search query, the system comprising:
    a processor in communication with storage, the processor configured to execute instructions from the storage to cause the system to:
      receive, from a user device, a first search query including one or more search terms;
      obtain a list of search results for the first search query;
      determine, based on tracking previous online user interactions with a set of unmodified search results for one or more previous search queries that included the one or more search terms, a first engagement score associated with the first search query, wherein the first engagement score represents overall previous online user engagement with the set of unmodified search results;
      determine that the first engagement score is lower than a first threshold;
      responsive to determining that the first engagement score is lower than the first threshold, modify the list of search results by:
        selecting a first search result from the list of search results;
        identifying a candidate word or phrase in the first search result that is interchangeable with a corresponding query word or phrase found in the one or more search terms; and
        generating a modified list of search results based on the list of search results, the generating including substituting the candidate word or phrase in the first search result with the corresponding query word or phrase; and
      provide the modified list of search results to the user device in response to the first search query.

12. The system of claim 11, wherein the first engagement score associated with the first search query is determined based on tracked previous online user interactions including at least one of:
    user click-through rates for the one or more previous search queries that included the one or more of the search terms;
    average viewing times for results of the one or more previous search queries;
    records of customer support contacts correlated with the one or more previous search queries; or
    an average time gap between the presentation of search results for the one or more previous search queries and performing of subsequent related search queries.

13. The system of claim 11, wherein at least one of a title and a summary of the first search result is provided using the corresponding query word or phrase in the modified list of search results.

14. The system of claim 11, wherein the processor is configured to execute the instructions to cause the system to:
    receive an indication corresponding to a selection of a selected one of the search results;
    responsive to receiving the indication, generate modified digital content from original digital content corresponding to the selected one search result, wherein, in the modified digital content, the candidate word or phrase is substituted in the digital content with the corresponding query word or phrase; and
    provide the modified digital content to the user device.

15. The system of claim 11, wherein identifying the candidate word or phrase includes consulting a stored mapping between the candidate word or phrase and the corresponding query word or phrase.

16. The system of claim 15, wherein the mapping includes a plurality of candidate words or phrases and a plurality of corresponding query words or phrases, wherein each of the plurality of candidate words or phrases maps to one or more of the plurality of corresponding query words or phrases.

17. The system of claim 16, wherein the mapping between a given candidate word or phrase from the plurality of candidate words or phrases and a respective corresponding query word or phrase from the plurality of corresponding query words or phrases is determined based on at least one of:

the given candidate word or phrase being synonymous with the respective corresponding query word or phrase based on a dictionary;

the given candidate word or phrase being synonymous with the respective corresponding query word or phrase using natural language processing; or the given candidate word or phrase being related with the respective corresponding query word or phrase based on a query log.

18. The system of claim 11, wherein the processor is configured to execute the instructions to cause the system to:

determine a second engagement score for the first search query based on tracked online user interaction, via the user device, with the modified list of search results, the second engagement score representing overall user engagement with the modified list of search results;

determine that the second engagement score for the first search query exceeds a second threshold; and responsive to determining that the second engagement score for the first search query exceeds the second threshold, store a mapping relationship between the candidate word or phrase and the corresponding query word or phrase.

19. The system of claim 18, wherein the second threshold is based on the first engagement score.

20. A non-transitory computer-readable medium storing instructions that, when executed by a processor of a system, cause the system to:

receive, from a user device, a first search query including one or more search terms;

obtain a list of search results for the first search query;

determine, based on tracking previous online user interactions with a set of unmodified search results for one or more previous search queries that included the one or more search terms, a first engagement score associated with the first search query, wherein the first engagement score represents overall previous online se engagement with the set of unmodified search results;

determine that the first engagement score is lower than a first threshold;

responsive to determining that the first engagement score is lower than the first threshold, modify the list of search results by:

selecting a first search result from the list of search results;

identifying a candidate word or phrase in the first search result that is interchangeable with a corresponding query word or phrase found in the one or more search terms; and generating a modified list of search results based on the list of search results, the generating including substituting the candidate word or phrase in the first search result with the corresponding query word or phrase; and provide the modified list of search results to the user device in response to the first search query.

21. The non-transitory computer-readable medium of claim 20, wherein the stored instructions, when executed by a processor of a system, cause the system to:

receive an indication corresponding to a selection of a selected one of the search results;

responsive to receiving the indication, generate modified digital content from original digital content corresponding to the selected one search result, wherein, in the modified digital content, the candidate word or phrase is substituted in the digital content with the corresponding query word or phrase; and provide the modified digital content to the user device.

* * * * *

UNITED STATES PATENT AND TRADEMARK OFFICE
CERTIFICATE OF CORRECTION

| | | |
|---|---|---|
| PATENT NO. | : 11,586,636 B2 | |
| APPLICATION NO. | : 16/951821 | |
| DATED | : February 21, 2023 | |
| INVENTOR(S) | : David Fernig et al. | |

It is certified that error appears in the above-identified patent and that said Letters Patent is hereby corrected as shown below:

In the Claims

In Column 34 Line 2 (Claim 20): "engagement score represents overall previous online se" should read --engagement score represents overall previous online--.

Signed and Sealed this
Ninth Day of May, 2023

Katherine Kelly Vidal
*Director of the United States Patent and Trademark Office*